(12) United States Patent
Yun et al.

(10) Patent No.: US 10,313,995 B2
(45) Date of Patent: Jun. 4, 2019

(54) APPARATUS AND METHOD FOR OPERATING RADIO ACCESS TECHNOLOGY IN COMMUNICATION SYSTEM SUPPORTING TIME DIVISION DUPLEXING SCHEME

(71) Applicant: Samsung Electronics Co., Ltd, Gyeonggi-do (KR)

(72) Inventors: Yeo-Hun Yun, Gyeonggi-do (KR); Min Sagong, Gyeonggi-do (KR); Tae-Young Kim, Seoul (KR); Ji-Yun Seol, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 15/253,850

(22) Filed: Aug. 31, 2016

(65) Prior Publication Data
US 2017/0064658 A1 Mar. 2, 2017

(30) Foreign Application Priority Data
Aug. 31, 2015 (KR) .......................... 10-2015-0122444

(51) Int. Cl.
*H04L 5/00* (2006.01)
*H04L 5/14* (2006.01)
*H04W 4/70* (2018.01)
*H04W 56/00* (2009.01)

(52) U.S. Cl.
CPC ....... *H04W 56/0015* (2013.01); *H04L 5/1438* (2013.01); *H04L 5/1469* (2013.01); *H04L 5/0023* (2013.01); *H04L 5/0035* (2013.01); *H04L 5/0092* (2013.01); *H04W 4/70* (2018.02)

(58) Field of Classification Search
CPC .................................................... H04W 56/00
See application file for complete search history.

(56) References Cited

U.S. PATENT DOCUMENTS

| | | | | |
|---|---|---|---|---|
| 2009/0040918 A1* | 2/2009 | Jiang | ....................... | H04B 1/59 370/210 |
| 2013/0044617 A1* | 2/2013 | Boixadera | ......... | H04W 56/0045 370/252 |
| 2013/0272173 A1* | 10/2013 | Niu | ....................... | H04W 52/04 370/280 |

(Continued)

FOREIGN PATENT DOCUMENTS

WO   WO 2008/105718 A1   9/2008

*Primary Examiner* — Kevin C. Harper

(57) ABSTRACT

The present disclosure relates to a pre-5th-generation (5G) or 5G communication system to be provided for supporting higher data rates beyond 4th-generation (4G) communication system such as a long term evolution (LTE). An operating method of a base station (BS) in a communication system supporting a time division multiplexing (TDD) scheme is provided. The operating method includes transmitting, to a user equipment (UE) which uses a second radio access technology (RAT) different from a first RAT used by other BS different from the BS, information related to downlink (DL) and uplink (UL) timing of the other BS and margin information for synchronizing DL and UL timing of the first RAT with DL and UL timing of the second RAT, wherein the information related to the DL and UL timing of the other BS is received from the other BS, or predicted by the BS.

20 Claims, 15 Drawing Sheets

(56) References Cited

U.S. PATENT DOCUMENTS

| | | | | |
|---|---|---|---|---|
| 2014/0301251 A1* | 10/2014 | Chen | ............... | H04W 72/02 |
| | | | | 370/278 |
| 2014/0307598 A1* | 10/2014 | Mizusawa | ......... | H04W 72/0446 |
| | | | | 370/280 |
| 2015/0373550 A1* | 12/2015 | Hong | ............ | H04W 72/0446 |
| | | | | 370/254 |
| 2018/0192419 A1* | 7/2018 | Yi | ............ | H04B 7/26 |

* cited by examiner

APPARATUS AND METHOD FOR OPERATING RADIO ACCESS TECHNOLOGY IN COMMUNICATION SYSTEM SUPPORTING TIME DIVISION DUPLEXING SCHEME

CROSS-REFERENCE TO RELATED APPLICATION(S) AND CLAIM OF PRIORITY

The present application is related to and claims the benefit of priority under 35 U.S.C. § 119(a) of a Korean patent application filed on Aug. 31, 2015 in the Korean Intellectual Property Office and assigned Serial No. 10-2015-0122444, the entire disclosure of all each of which is hereby incorporated by reference.

TECHNICAL FIELD

The present disclosure relates to an apparatus and method for operating a radio access technology (RAT) in a communication system supporting a time division multiplexing (TDD) scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Machine type communication is rapidly evolving from an M2M communication concept which supports communication between people and things, or between things, based on a mobile communication network into a concept of interacting with all information of real and virtual worlds as well as things while extending its area to the Internet. Namely, the M2M communication that enables the intelligent communication between people and things, or between things, at anytime and anywhere in real time in a stable and convenient manner is extending its area to internet of things (IoT) while connecting all surrounding things through the Internet.

The IoT refers to a technology of connecting various types of things, which have a sensor and a communication function embedded therein, to the Internet. Here, the things include various embedded systems (a computer system of an electronic device such as a smart phone), such as home appliances, a mobile device, wearable computers, etc. The things connected to the IoT have to be connected to an internet based on a unique internet protocol (IP) address by which the things can be identified, and may have sensors embedded therein for acquiring information from an external environment.

Recently, IoT has been rapidly developed, study for a cellular IoT (CIoT) which is based on a cellular scheme has been actively progressed. So, communication providers, which operate a communication system using a long term evolution (LTE) (hereinafter, "LTE communication system") scheme, have progressed study for a scheme of enabling to operate a CIoT on a guard band of the LTE communication system. This is why the CIoT may stably support a service compared to an IoT that is not based on the cellular scheme (hereinafter, "non-cellular IoT"), and it is easy to manage the CIoT compared to the non-cellular IoT in an operation aspect.

One of important issues in a case in which the CIoT is operated on the guard band of the LTE communication system is interference, which occurs between the LTE communication system and the CIoT. Here, the guard band denotes a band on which the LTE communication system does not transmit a signal for satisfying requirement for radiation for neighbor band (i.e., out-of-band radiation).

So, a communication system, which intends to use the guard band, needs to operate such that performance of the LTE communication system is not decreased and to satisfy an out-of-band radiation requirement defined in the LTE communication system.

Meanwhile, a duplexing operation mode of the LTE communication system may be classified into a frequency division duplexing (FDD) operation mode and a TDD operation mode.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for operating various RATs in a communication system supporting a TDD scheme.

The present disclosure provides an apparatus and method for operating various RATs by considering interference in a communication system supporting a TDD scheme.

Another aspect of the present disclosure is to provide an apparatus and method for synchronizing DL and UL timing between RATs in a communication system supporting a TDD scheme.

In accordance with an aspect of the present disclosure, an operating method of a base station (BS) in a communication system supporting a time division multiplexing (TDD) scheme is provided. The operating method includes transmitting, to a user equipment (UE) which uses a second radio access technology (RAT) different from a first RAT which other BS different from the BS uses, information related to downlink (DL) and uplink (UL) timing of the other BS and margin information for synchronizing DL and UL timing of the first RAT with DL and UL timing of the second RAT, wherein the information related to the DL and UL timing of the other BS is received from the other BS, or predicted by the BS.

In accordance with another aspect of the present disclosure, an operating method of a base station (BS) in a communication system supporting a time division multiplexing (TDD) scheme is provided. The operating method includes transmitting, to a user equipment (UE) which uses a second radio access technology (RAT) different from a first RAT used by other BS different from the BS, information related to downlink (DL) and uplink (UL) timing of the other BS and margin information for synchronizing DL and UL timing of the first RAT with DL and UL timing of the second RAT, wherein the information related to the DL and UL timing of the other BS is received from the other BS, or predicted by the BS.

In accordance with still another aspect of the present disclosure, an operating method of a user equipment (UE) in a communication system supporting a time division multiplexing (TDD) scheme is provided. The operating method includes receiving, from a second base station (BS) which uses a second radio access technology (RAT), information related to a downlink (DL) and uplink (UL) timing of a first BS which uses a first RAT different from the second RAT and margin information for synchronizing DL and UL timing of the first RAT with DL and UL timing of the second RAT.

In accordance with still another aspect of the present disclosure, an operating method of a base station (BS) in a communication system supporting a time division multiplexing (TDD) scheme is provided. The operating method includes receiving, from other BS which uses a first radio access technology (RAT), information related to downlink (DL) and uplink (UL) timing of the other BS; and transmitting, to a user equipment (UE) which uses a second RAT different from the first RAT, information related to the DL and UL timing of the other BS and margin information for synchronizing DL and UL timing of the first RAT and DL and UL timing of the second RAT.

In accordance with still another aspect of the present disclosure, an operating method of a base station (BS) in a communication system supporting a time division multiplexing (TDD) scheme is provided. The operating method includes predicting information related to downlink (DL) and uplink (UL) timing of other BS which uses a first radio access technology (RAT); and transmitting, to a user equipment (UE) which uses a second RAT different from the first RAT, information related to the predicted DL and UL timing of the other BS and margin information for synchronizing DL and UL timing of the first RAT and DL and UL timing of the second RAT.

In accordance with still another aspect of the present disclosure, an operating method of a user equipment (UE) in a communication system supporting a time division multiplexing (TDD) scheme is provided. The operating method includes receiving, from a second base station (BS) which uses a second radio access technology (RAT), information related to a downlink (DL) and uplink (UL) timing of a first BS which uses a first RAT different from the second RAT and margin information for synchronizing DL and UL timing of the first RAT with DL and UL timing of the second RAT, wherein the information related to the DL and UL timing of the first BS is received by the second BS from the first BS.

In accordance with still another aspect of the present disclosure, an operating method of a user equipment (UE) in a communication system supporting a time division multiplexing (TDD) scheme is provided. The operating method includes receiving, from a second base station (BS) which uses a second radio access technology (RAT), information related to a downlink (DL) and uplink (UL) timing of a first BS which uses a first RAT different from the second RAT and margin information for synchronizing DL and UL timing of the first RAT with DL and UL timing of the second RAT, wherein the information related to the DL and UL timing of the first BS is predicted by the second BS.

In accordance with still another aspect of the present disclosure, a base station (BS) in a communication system supporting a time division multiplexing (TDD) scheme is provided. The BS includes a transmitter configured to transmit, to a user equipment (UE) which uses a second radio access technology (RAT) different from a first RAT used by other BS different from the BS, information related to downlink (DL) and uplink (UL) timing of the other BS and margin information for synchronizing DL and UL timing of the first RAT with DL and UL timing of the second RAT, wherein the information related to the DL and UL timing of the other BS is received from the other BS, or predicted by the BS.

In accordance with still another aspect of the present disclosure, a user equipment (UE) in a communication system supporting a time division multiplexing (TDD) scheme is provided. The UE includes a receiver configured to receive, from a second base station (BS) which uses a second radio access technology (RAT), information related to a downlink (DL) and uplink (UL) timing of a first BS which uses a first RAT different from the second RAT and margin information for synchronizing DL and UL timing of the first RAT with DL and UL timing of the second RAT.

In accordance with still another aspect of the present disclosure, a base station (BS) in a communication system supporting a time division multiplexing (TDD) scheme is provided. The BS includes a receiver configured to receive, from other BS which uses a first radio access technology (RAT), information related to downlink (DL) and uplink (UL) timing of the other BS, and a transmitter configured to transmit, to a user equipment (UE) which uses a second RAT different from the first RAT, information related to the DL and UL timing of the other BS and margin information for synchronizing DL and UL timing of the first RAT and DL and UL timing of the second RAT.

In accordance with still another aspect of the present disclosure, a base station (BS) in a communication system supporting a time division multiplexing (TDD) scheme is provided. The BS includes a controller configured to predict information related to downlink (DL) and uplink (UL) timing of other BS which uses a first radio access technology (RAT); and a transmitter configured to transmit, to a user equipment (UE) which uses a second RAT different from the first RAT, information related to the predicted DL and UL timing of the other BS and margin information for synchronizing DL and UL timing of the first RAT and DL and UL timing of the second RAT.

In accordance with still another aspect of the present disclosure, a user equipment (UE) in a communication system supporting a time division multiplexing (TDD) scheme is provided. The UE includes a receiver configured to receive, from a second base station (BS) which uses a second radio access technology (RAT), information related to a downlink (DL) and uplink (UL) timing of a first BS which uses a first RAT different from the second RAT and margin information for synchronizing DL and UL timing of the first RAT with DL and UL timing of the second RAT, wherein the information related to the DL and UL timing of the first BS is received by the second BS from the first BS.

In accordance with still another aspect of the present disclosure, a user equipment (UE) in a communication system supporting a time division multiplexing (TDD) scheme is provided. The UE includes a receiver configured to receive, from a second base station (BS) which uses a second radio access technology (RAT), information related to a downlink (DL) and uplink (UL) timing of a first BS which uses a first RAT different from the second RAT and margin information for synchronizing DL and UL timing of the first RAT with DL and UL timing of the second RAT, wherein the information related to the DL and UL timing of the first BS is predicted by the second BS.

Other aspects, advantages, and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
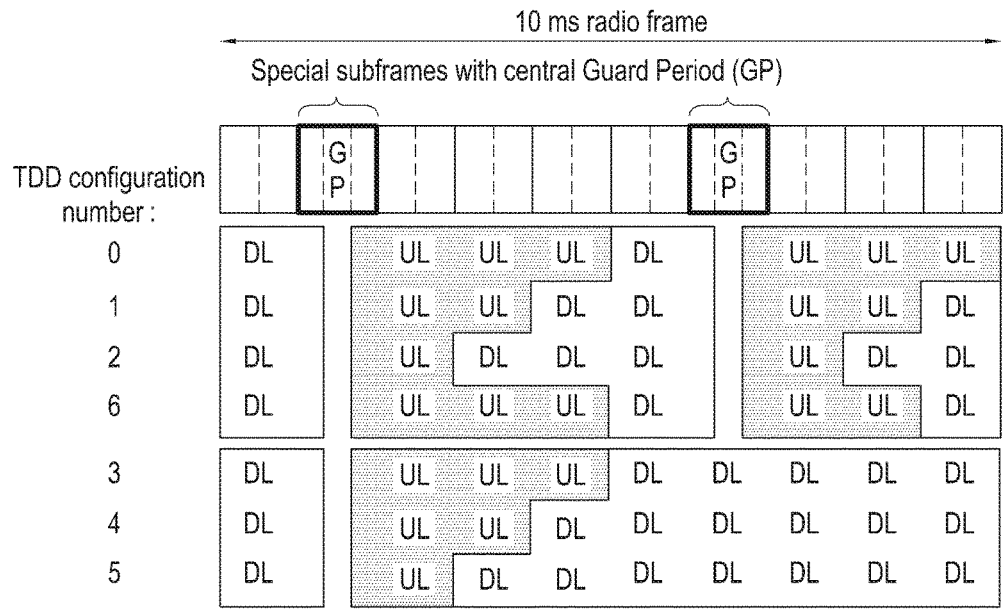
FIG. 1 illustrates a TDD frame structure of an LTE communication system.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device.

The following description with reference to the accompanying drawings is provided to assist in a comprehensive understanding of various embodiments of the present disclosure as defined by the claims and their equivalents. It includes various specific details to assist in that understanding but these are to be regarded as examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, a device which is installed at a vehicle, and attachable and detachable from the vehicle, a device which is installed at a vehicle, and impossible to remove from the vehicle, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a signal transmitting apparatus may be a user equipment (UE) or a base station (BS).

According to various embodiments of the present disclosure, a signal receiving apparatus may be a UE or a BS.

According to various embodiments of the present disclosure, it will be assumed that the term UE may be interchangeable with the term terminal, mobile station (MS), wireless terminal, mobile device, and/or the like.

According to various embodiments of the present disclosure, it will be assumed that the term BS may be interchangeable with the term evolved node B (eNB), access point (AP), and/or the like.

An embodiment of the present disclosure proposes an apparatus and method for operating various radio access technologies (RATs) in a communication system supporting a time division multiplexing (TDD) scheme.

An embodiment of the present disclosure proposes an apparatus and method for operating various RATs by considering interference in a communication system supporting a TDD scheme.

An embodiment of the present disclosure proposes an apparatus and method for synchronizing DL and UL timing between RATs in a communication system supporting a TDD scheme.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSDPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an evolved packet system (EPS), and a mobile internet protocol (Mobile IP) system, and/or the like.

A TDD frame structure of an LTE communication system will be described with reference to FIG. 1.

FIG. 1 illustrates a TDD frame structure of an LTE communication system.

Referring to FIG. 1, a length of each radio frame is ten milliseconds (ms). Each radio frame includes ten subframes. A guard period (GP) is included in special subframes.

As illustrated in FIG. 1, the LTE communication system supports seven TDD configurations upon operating based on a TDD scheme. A uplink (UL) and downlink (DL) configuration which corresponds to each of the seven TDD configurations is illustrated in FIG. 1. A detailed description of the UL and DL configuration which corresponds to each of the seven TDD configurations will be omitted herein.

Information related to the TDD UL-DL configurations may be acquired from system information, and a fixed TDD UL-DL is used until the system information is changed. A macro cell, in which the number of mobile stations (MSs) that access a cell is relatively large and change in the amount of transmitted/received traffic is relatively small, may be normally operated based on the fixed TDD UL-DL configuration.

However, if cells that change in amount of transmitted/received traffic is relatively large operate based on a fixed TDD UL-DL configuration, the cells may not normally operate, so there is a need for changing a TDD UL-DL configuration. So, the cells that the change in the amount of the transmitted/received traffic is relatively large need to periodically change a TDD UL-DL configuration and inform MSs related to the changed TDD UL-DL configuration.

As described above, study for a CIoT has been actively progressed, so there is a need for considering a duplexing operation mode for a CIoT which coexists with an LTE communication system supporting a TDD scheme (hereinafter, "LTE TDD communication system").

A duplexing operation mode of a cellular internet of things (CIoT) that coexists with an LTE communication system using a TDD scheme (hereinafter, "LTE TDD communication system") will be considered.

Firstly, it will be considered that a duplexing operation mode of the CIoT includes a frequency division duplexing (FDD) operation mode and a FDD operation mode like the duplexing operation mode of the LTE TDD communication system. For convenience, a CIoT using an FDD scheme will be referred to as CIoT FDD, and a CIoT using a TDD scheme will be referred to as CIoT TDD.

A case in which an LTE TDD communication system coexists with a CIoT FDD will be described with reference to FIG. 2.

Figure 2:
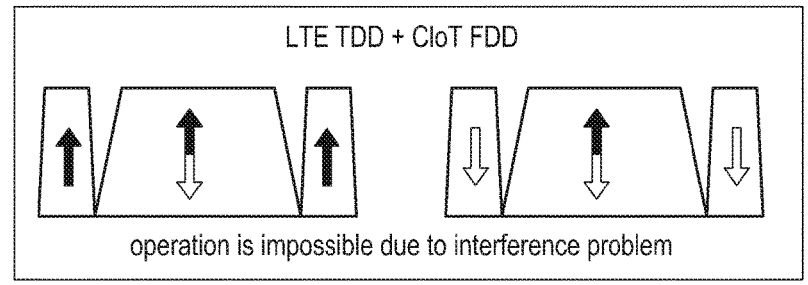
FIG. 2 illustrates a case in which an LTE TDD communication system coexists with a CIoT FDD.

FIG. 2 illustrates a case in which an LTE TDD communication system coexists with a CIoT FDD.

Referring to FIG. 2, in a case in which an LTE TDD communication system coexists with a CIoT FDD, an interference signal from an LTE BS to a CIoT BS is relatively great, so it is substantially impossible to operate the CIoT FDD. This will be described with reference to FIG. 4, and a detailed description thereof will be omitted herein.

A case in which an LTE TDD communication system coexists with a CIoT FDD has been described with reference to FIG. 2, and a case in which an LTE TDD communication system coexists with a CIoT TDD will be described with reference to FIG. 3.

Figure 3:
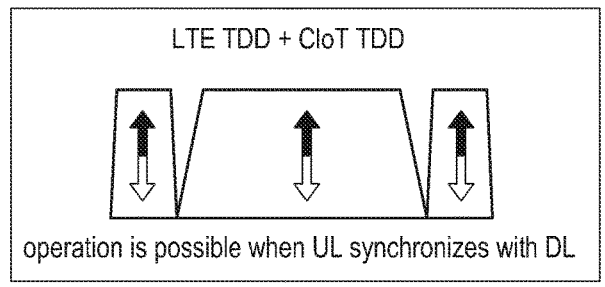
FIG. 3 illustrates a case in which an LTE TDD communication system coexists with a CIoT TDD.

FIG. 3 illustrates a case in which an LTE TDD communication system coexists with a CIoT TDD.

Referring to FIG. 3, in a case in which an LTE TDD communication system coexists with a CIoT TDD, the CIoT TDD may be normally operated when the LTE TDD communication system synchronizes with the CIoT TDD synchronize for a UL and a DL.

On the other hand, when the LTE TDD communication system does not synchronize with the CIoT TDD for the UL and the DL, an interference from an LTE BS to a CIoT BS is relatively large like a case in which an LTE TDD communication coexists with a CIoT FDD, so it is substantially impossible to operate the CIoT TDD.

A case in which an LTE TDD communication system coexists with a CIoT TDD has been described with reference to FIG. 3, and an interference that occurs in a case in which an LTE TDD communication system coexists with a CIoT FDD will be described with reference to FIG. 4.

Figure 4:
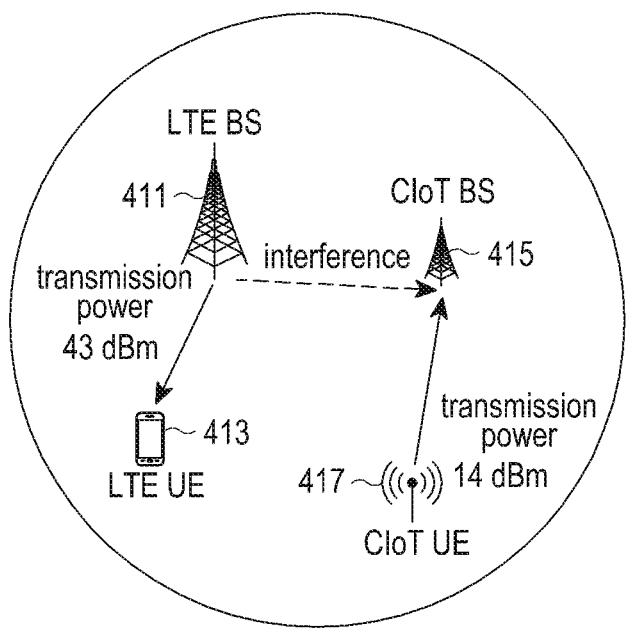
FIG. 4 illustrates an interference that occurs in a case in which an LTE TDD communication system coexists with a CIoT FDD.
Figure 4:
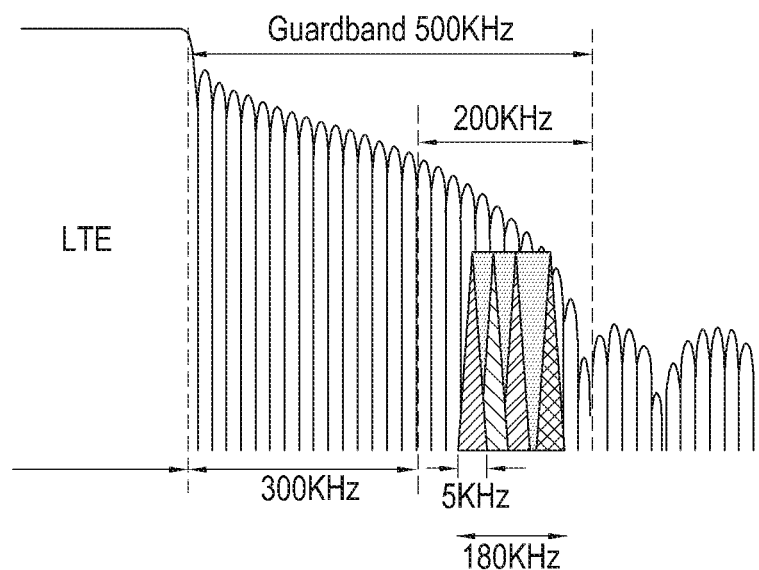

FIG. 4 illustrates an interference that occurs in a case in which an LTE TDD communication system coexists with a CIoT FDD.

Referring to FIG. 4, an LTE TDD communication system coexists with a CIoT FDD, an LTE BS 411 transmits a signal to an LTE UE 413 based on transmission power (e.g., transmission power of 43 dBm), and a CIoT UE 417 transmits a signal to a CIoT BS 415 based on transmission power (e.g., transmission power of 14 dBm). In this case, the signal transmitted by the LTE BS 411 acts as an interference signal for the CIoT BS 415.

So, when the LTE TDD communication system coexists with the CIoT FDD, an interference signal from the LTE BS 411 to the CIoT BS 415 is relatively large, so it is substantially impossible to operate the CIoT FDD.

So, an embodiment of the present disclosure provides a scheme of acquiring UL/DL synchronization between an LTE communication system and a CIoT for normally operating the CIoT in the LTE communication system. An embodiment of the present disclosure proposes a scheme of acquiring UL/DL synchronization between an LTE TDD communication system and a CIoT TDD for normally operating the CIoT TDD in the LTE TDD communication system.

An example of a process of acquiring timing synchronization between an LTE TDD communication system and a CIoT TDD according to an embodiment of the present disclosure will be described with reference to FIG. 5.

Figure 5:
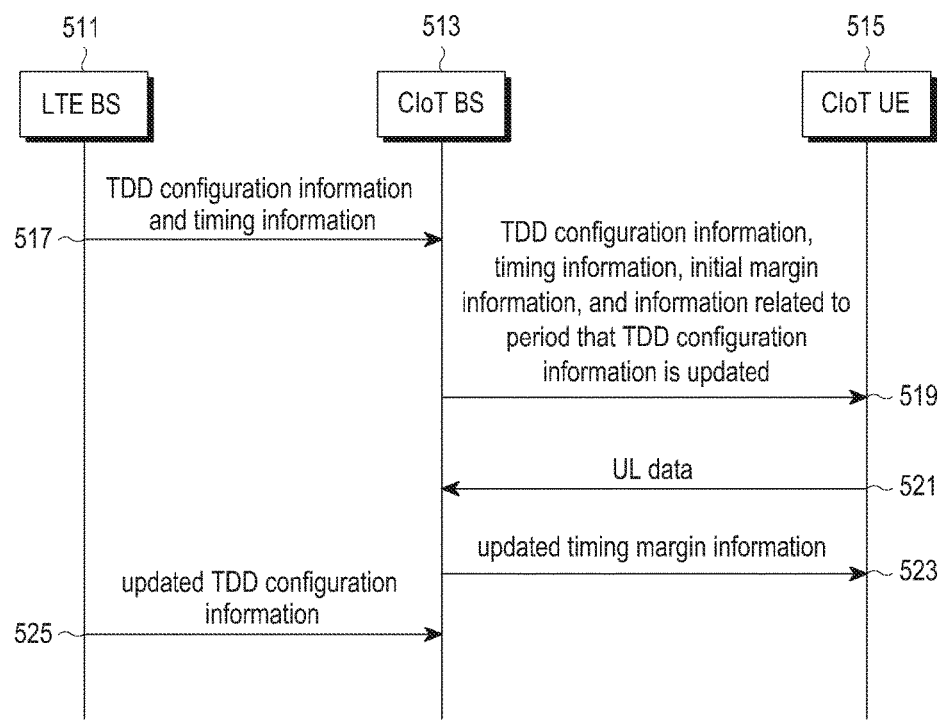
FIG. 5 illustrates an example of a process of acquiring timing synchronization between an LTE TDD communication system and a CIoT TDD according to an embodiment of the present disclosure.

FIG. 5 illustrates an example of a process of acquiring timing synchronization between an LTE TDD communication system and a CIoT TDD according to an embodiment of the present disclosure.

Referring to FIG. 5, it will be noted that a process of acquiring timing synchronization between an LTE TDD communication system and a CIoT TDD is a process of acquiring timing synchronization between an LTE TDD communication system and a CIoT TDD in a case in which an LTE BS may cooperate with a CIoT BS or a CIoT BS includes an LTE transceiver.

Referring to FIG. 5, an LTE BS 511 transmits a message including TDD configuration information and timing information to a CIoT BS 513 at operation 517. The TDD configuration information may be a TDD UL-DL number, and a detailed description of the TDD configuration information will be omitted herein. There is no limitation on a format of the message including the TDD configuration information and the timing information.

After receiving the message including the TDD configuration information and the timing information from the LTE BS 511, the CIoT BS 513 transmits, to a CIoT UE 515, a message including the TDD configuration information, the timing information, initial margin operation, and information related to a period that TDD configuration information is updated at operation 519. The initial margin information will be described below. For example, the TDD configuration information may be transmitted through a system information block (SIB) used in the LTE TDD communication system. So, it will be assumed that the CIoT BS 513 includes an LTE transceiver thereby receiving the TDD configuration information.

Meanwhile, a CIoT DL signal may be synchronized with an LTE DL signal and transmitted. It may be difficult that a CIoT UL signal is synchronized with an LTE UL signal and transmitted since an open-loop timing advance (TA) will be acquired. A symbol length of the CIoT UL signal is different from a symbol length of the LTE UL signal, so it may be difficult that the CIoT UL signal is correctly synchronized with the LTE UL signal and transmitted.

In order to prevent interference between the CIoT UL signal and the LTE UL signal, a timing margin is applied to the CIoT UL signal. The CIoT UE 515 knows correct timing information for an LTE UL signal, so the CIoT UE 515 applies a timing margin to the last part of the CIoT UL signal.

The timing margin will be described below.

An initial value of the timing margin is an initial margin, and the timing margin may be updated. The initial margin may be a preset value. The initial margin may be determined based on a cell radius of a cell which the CIoT TDD operates, a maximum cell radius of a cell which the CIoT TDD may operate, or a speed of light.

After receiving, from the CIoT BS 513, the message including the TDD configuration information, the timing information, the initial margin operation, and the information related to the period that TDD configuration information is updated, the CIoT UE 515 transmits UL data to the CIoT BS 513 based on the received TDD configuration information, timing information, initial margin operation, and information related to the period that TDD configuration information is updated if there is the UL data to be transmitted at operation 521.

The CIoT BS 513 may update a timing margin if necessary, and transmits a message including information on the updated timing margin to the CIoT UE 515 at operation 523.

The LTE BS 511 may update a TDD configuration information if necessary, and transmits a message including the updated TDD configuration information to the CIoT BS 513 at operation 525.

An example of a process of acquiring timing synchronization between an LTE TDD communication system and a CIoT TDD according to an embodiment of the present disclosure has been described with reference to FIG. 5, and an example of a frame structure of an LTE TDD communication system and a DL/UL operating process of a CIoT TDD in a case in which the LTE TDD communication system coexists with the CIoT TDD according to an embodiment of the present disclosure will be described with reference to FIG. 6.

Figure 6:
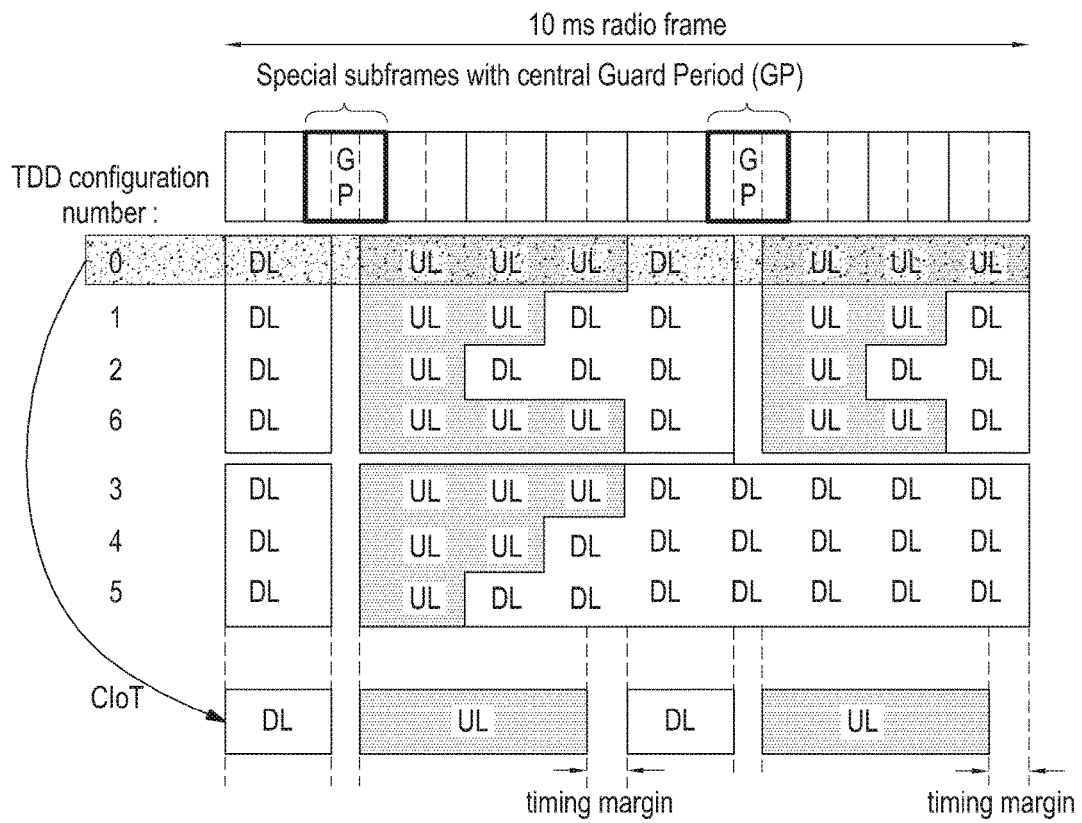
FIG. 6 illustrates an example of a frame structure of an LTE TDD communication system and a DL/UL operating process of a CIoT TDD in a case in which the LTE TDD communication system coexists with the CIoT TDD according to an embodiment of the present disclosure.

FIG. 6 illustrates an example of a frame structure of an LTE TDD communication system and a DL/UL operating process of a CIoT TDD in a case in which the LTE TDD communication system coexists with the CIoT TDD according to an embodiment of the present disclosure.

Referring to FIG. 6, a length of each radio frame is 10 ms. Each radio frame includes 10 subframes. A guard period (GP) is included in special subframes.

As illustrated in FIG. 6, the LTE TDD communication system supports seven TDD configurations. A UL and DL configuration which corresponds to each of the seven TDD configurations, i.e., a TDD UL-DL configuration is illustrated in FIG. 6. A detailed description of the UL and DL configuration which corresponds to each of the seven TDD configurations (i.e., the TDD UL-DL configuration) will be omitted herein.

As described in FIG. 5, an LTE BS 511 provides TDD configuration information to a CIoT BS (at operation 517), and the CIoT BS 513 provides the TDD configuration information to a CIoT UE 515 (at operation 519). So, the CIoT TDD may acquire DL/UL synchronization for an LTE TDD communication system, and apply a timing margin to a CIoT UL signal for preventing interference between the CIoT UL signal and an LTE UL signal.

An example of a frame structure of an LTE TDD communication system and a DL/UL operating process of a CIoT TDD in a case in which the LTE TDD communication system coexists with the CIoT TDD according to an embodiment of the present disclosure has been described with reference to FIG. 6, and another example of a process of acquiring timing synchronization between an LTE TDD communication system and a CIoT TDD according to an embodiment of the present disclosure will be described with reference to FIG. 7.

Figure 7:
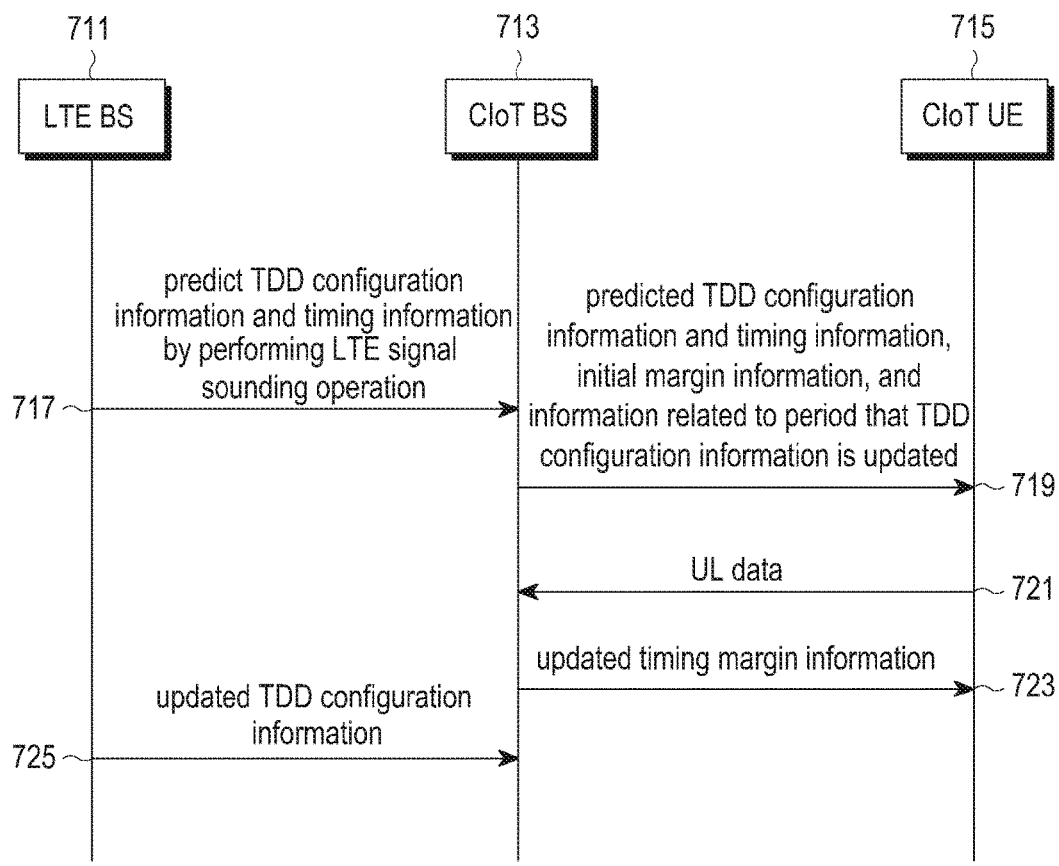
FIG. 7 illustrates another example of a process of acquiring timing synchronization between an LTE TDD communication system and a CIoT TDD according to an embodiment of the present disclosure.

FIG. 7 illustrates another example of a process of acquiring timing synchronization between an LTE TDD communication system and a CIoT TDD according to an embodiment of the present disclosure.

Referring to FIG. 7, it will be noted that a process of acquiring timing synchronization between an LTE TDD communication system and a CIoT TDD is a process of acquiring timing synchronization between an LTE TDD communication system and a CIoT TDD in a case in which an LTE BS may not cooperate with a CIoT BS or a CIoT BS does not include an LTE transceiver.

A CIoT BS 713 does not include an LTE transceiver, so the CIoT BS 713 may not decode an LTE signal transmitted by an LTE BS 711. So, the CIoT BS 713 performs an LTE signal sounding operation to predict TDD configuration information and timing information used in the LTE BS 711 at operation 717. The TDD configuration information may be a TDD UL-DL number, and a detailed description of the TDD configuration information will be omitted herein. The LTE signal sounding operation may be implemented with various formats, and a detailed description thereof will be omitted herein.

After predicting the TDD configuration information and the timing information, the CIoT BS 713 transmits, to a CIoT UE 715, a message including the predicted TDD configuration information and timing information, initial margin operation, and information related to a period that TDD configuration information is updated at operation 719.

Since the CIoT BS 713 does not receive the TDD configuration information and timing information from the LTE BS 711, that is, the CIoT BS 713 does not include an LTE transceiver and it is impossible to decode an LTE signal, it may be difficult to acquire correct synchronization for a DL/UL of an LTE TDD communication system.

So, the CIoT BS 713 needs to apply a timing margin which is applied to a CIoT UL signal to a first part of the CIoT UL signal as well as the last part of the CIoT UL signal unlike a case in which the CIoT BS 713 includes the LTE transceiver.

The initial margin information will be described below.

The CIoT BS 713 may not decode an LTE signal, so the CIoT BS 713 may not acquire correct timing for the UL/DL of the LTE TDD communication system. So, the CIoT BS 713 needs to apply timing margin to a CIoT DL signal as well as a CIoT UL signal, and the initial margin information includes initial DL margin information and initial UL margin information. Here, the initial margin information may be determined based on various parameters, e.g., a size of a window used on energy detection, a sliding interval, and/or the like.

A type of the window used on the energy detection and relation between timing predicting accuracy and a timing margin may be expressed as Table 1.

TABLE 1

| Type of used window | Timing predicting accuracy | Timing margin |
|---|---|---|
| A | <0.1 ms | 0.1 ms |
| B | <0.2 ms | 0.2 ms |
| C | <0.3 ms | 0.3 ms |
| D | <0.4 ms | 0.4 ms |
| E | <0.5 ms | 0.5 ms |
| ... | ... | ... |

As expressed in Table 1, it will be known that the more increased the timing predicting accuracy is, the more decreased the timing margin is.

The CIoT BS 713 may determine a UL timing margin based on timing accuracy and a UL TA margin. The CIoT BS 713 may determine a DL timing margin based on the timing accuracy.

After receiving the message including the predicted TDD configuration information and timing information, the initial margin operation, and the information related to the period that the TDD configuration information is updated, the CIoT UE 715 transmits UL data to the CIoT BS 713 based on the predicted TDD configuration information and timing information, the initial margin operation, and the information related to the period that the TDD configuration information is updated if there is the UL data to be transmitted at operation 721.

The CIoT BS 713 may update a timing margin if necessary, and transmits a message including information about the updated timing margin to the CIoT UE 715 at operation 723.

The LTE BS 711 may update a TDD configuration information if necessary. Even though the LTE BS 711 updates the TDD configuration information, the updated TDD configuration information is transmitted through an SIB used in an LTE TDD communication system, so the CIoT BS 713 may not directly receive the updated TDD configuration information. So, the CIoT BS 713 predicts the updated TDD configuration information through an LTE signal sounding operation at operation 725.

Another example of a process of acquiring timing synchronization between an LTE TDD communication system and a CIoT TDD according to an embodiment of the present disclosure has been described with reference to FIG. 7, and another example of a frame structure of an LTE TDD communication system and a DL/UL operating process of a CIoT TDD in a case in which the LTE TDD communication system coexists with the CIoT TDD according to an embodiment of the present disclosure will be described with reference to FIG. 8.

Figure 8:
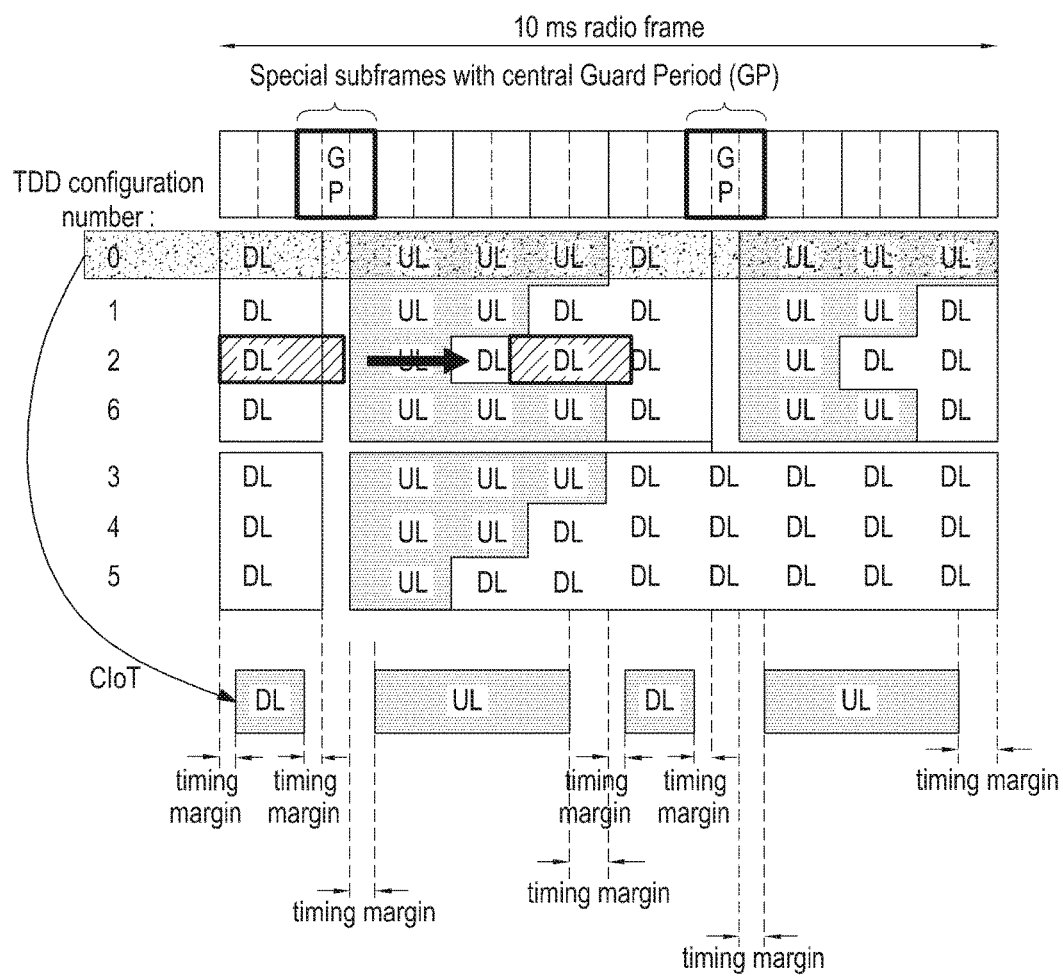
FIG. 8 illustrates another example of a frame structure of an LTE TDD communication system and a DL/UL operating process of a CIoT TDD in a case in which the LTE TDD communication system coexists with the CIoT TDD according to an embodiment of the present disclosure.

FIG. 8 illustrates another example of a frame structure of an LTE TDD communication system and a DL/UL operating process of a CIoT TDD in a case in which the LTE TDD communication system coexists with the CIoT TDD according to an embodiment of the present disclosure.

Referring to FIG. 8, a length of each radio frame is 10 ms. Each radio frame includes 10 subframes. A GP is included in special subframes.

As illustrated in FIG. 8, the LTE TDD communication system supports seven TDD configurations. A UL and DL configuration which corresponds to each of the seven TDD configurations, i.e., a TDD UL-DL configuration is illustrated in FIG. 8. A detailed description of the UL and DL configuration which corresponds to each of the seven TDD configurations, i.e., the TDD UL-DL configuration will be omitted herein.

As described in FIG. 7, a CIoT BS 713 predicts TDD configuration information used in an LTE BS 711 through an LTE signal sounding operation (at operation 717) to provide the predicted TDD configuration information to a CIoT UE 715 (at operation 719). The CIoT TDD may not acquire correct DL/UL synchronization for an LTE TDD communication system, so the CIoT TDD applies a timing margin to a CIoT DL signal for preventing interference between the CIoT DL signal and an LTE DL signal and applies a timing margin to a CIoT UL signal for preventing interference between the CIoT UL signal and an LTE UL signal.

Another example of a frame structure of an LTE TDD communication system and a DL/UL operating process of a CIoT TDD in a case in which the LTE TDD communication system coexists with the CIoT TDD according to an embodiment of the present disclosure has been described with reference to FIG. 8, and change in energy according to a TDD configuration number in a case in which an LTE TDD communication system coexists with a CIoT TDD according to an embodiment of the present disclosure will be described with reference to FIG. 9.

Figure 9:
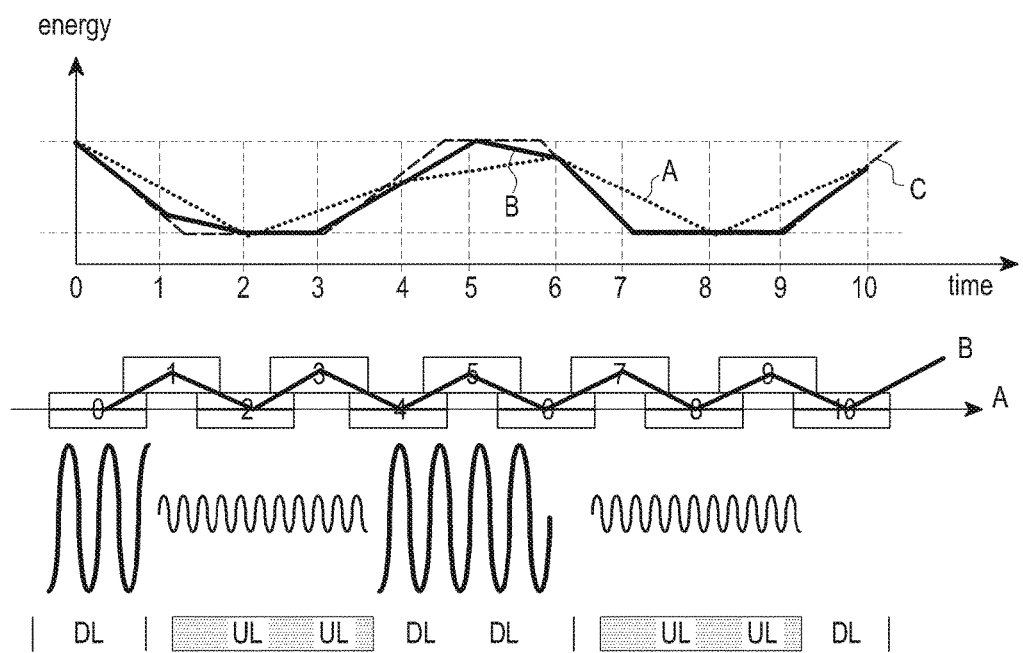
FIG. 9 illustrates change in energy according to a TDD configuration number in a case in which an LTE TDD communication system coexists with a CIoT TDD according to an embodiment of the present disclosure.

FIG. 9 illustrates change in energy according to a TDD configuration number in a case in which an LTE TDD communication system coexists with a CIoT TDD according to an embodiment of the present disclosure.

Referring to FIG. 9, energy change according to a TDD configuration number in FIG. 9 may be changed according to a window sliding interval. Energy change in a case in which a TDD configuration number is zero ("0") is illustrated in FIG. 9.

Timing estimating accuracy may vary according to the window sliding interval. For example, the narrower the window sliding interval is, the higher the timing estimating accuracy is. As illustrated in FIG. 9, it will be understood that timing estimating accuracy for a case in which a window sliding interval is operated as a graph B is higher than timing estimating accuracy for a case in which a window sliding interval is operated as a graph A.

Further, timing estimating accuracy may vary according to a characteristic of a window used on energy detection. According to the variation of the timing estimating accuracy, timing margin may vary. Timing estimating accuracy according to a characteristic of a window is illustrated as a form of a graph C in FIG. 9, and the graph C indicates correct energy change that a sliding interval is almost close to zero (0).

Change in energy according to a TDD configuration number in a case in which an LTE TDD communication system coexists with a CIoT TDD according to an embodiment of the present disclosure has been described with reference to FIG. 9, and a received signal level in a case in which a CIoT BS receives an LTE DL signal when an LTE TDD communication system coexists with a CIoT TDD according to an embodiment of the present disclosure.

Figure 10:
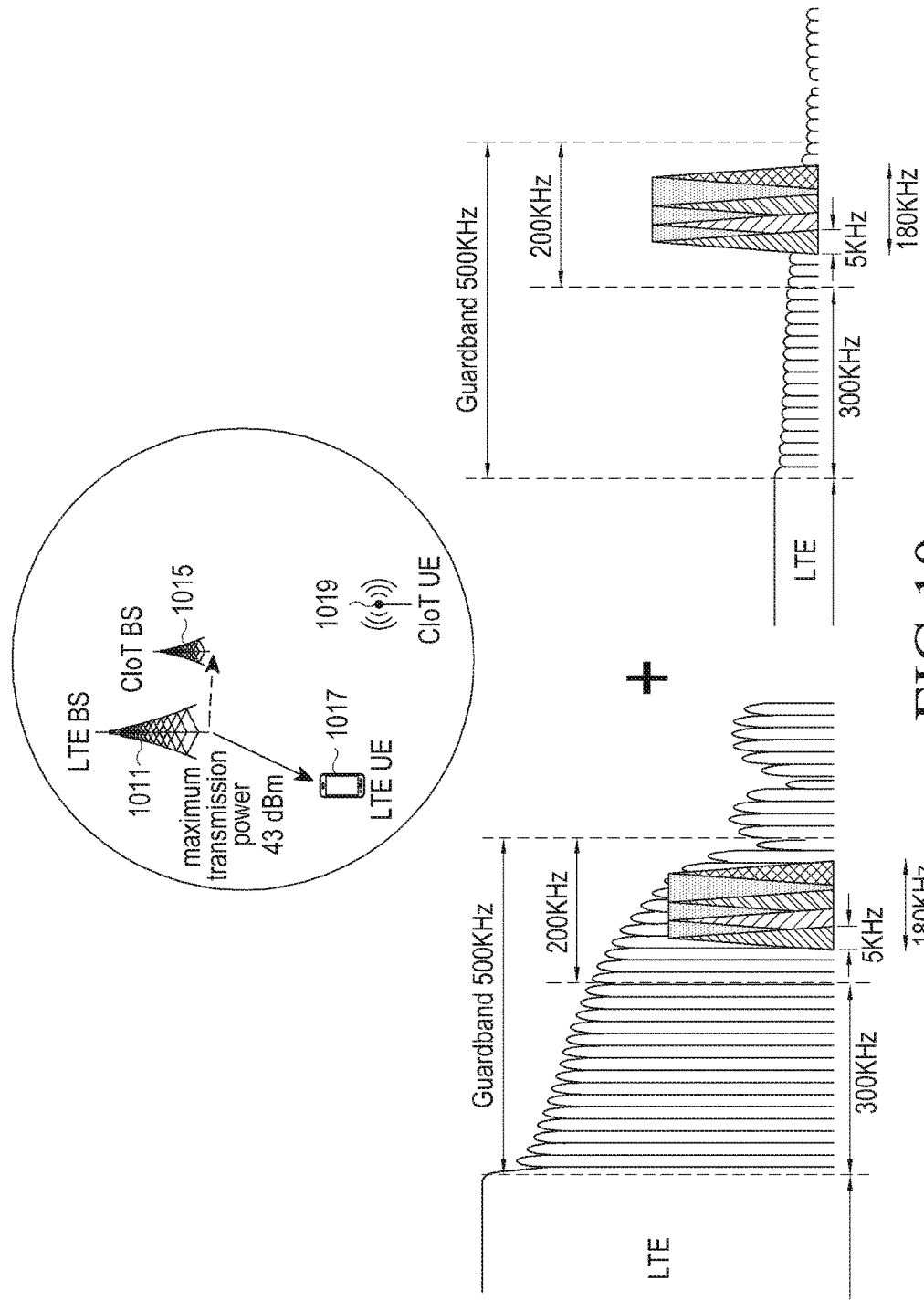
FIG. 10 illustrates a received signal level in a case in which a CIoT BS receives an LTE DL signal when an LTE TDD communication system coexists with a CIoT TDD according to an embodiment of the present disclosure.

FIG. 10 illustrates a received signal level in a case in which a CIoT BS receives an LTE DL signal when an LTE TDD communication system coexists with a CIoT TDD according to an embodiment of the present disclosure.

Referring to FIG. 10, an LTE BS 1011 transmits an LTE DL signal based on maximum transmission power 43 dBm to an LTE UE 1017, and a CIoT BS 1015 receives an LTE DL signal from the LTE BS 1011. In FIG. 10, a CIoT UE 1019 does not perform an transmitting/receiving operation.

As described in FIG. 10, the CIoT BS 1015 may detect whether a received LTE signal is an LTE DL signal or an LTE UL signal by detecting an energy of the received LTE signal. That is, transmission power applied to the LTE DL signal is significantly larger than transmission power applied to the LTE UL signal, so the CIoT BS 1015 may detect whether the received LTE signal is the LTE DL signal or the LTE UL signal by detecting an energy of the received LTE signal.

The CIoT BS 1015 may detect energy of a received LTE signal by detecting energy in a guardband (GB) region without detecting energy in an inband region of an LTE TDD communication system, so the CIoT BS 1015 may detect whether the received LTE signal is an LTE DL signal or an LTE UL signal.

A received signal level in a case in which a CIoT BS 1015 receives an LTE DL signal when an LTE TDD communication system coexists with a CIoT TDD according to an embodiment of the present disclosure has been described with reference to FIG. 10, and a received signal level in a case in which a CIoT BS 1015 receives an LTE UL signal when an LTE TDD communication system coexists with a CIoT TDD according to an embodiment of the present disclosure will be described with reference to FIG. 11.

Figure 11:
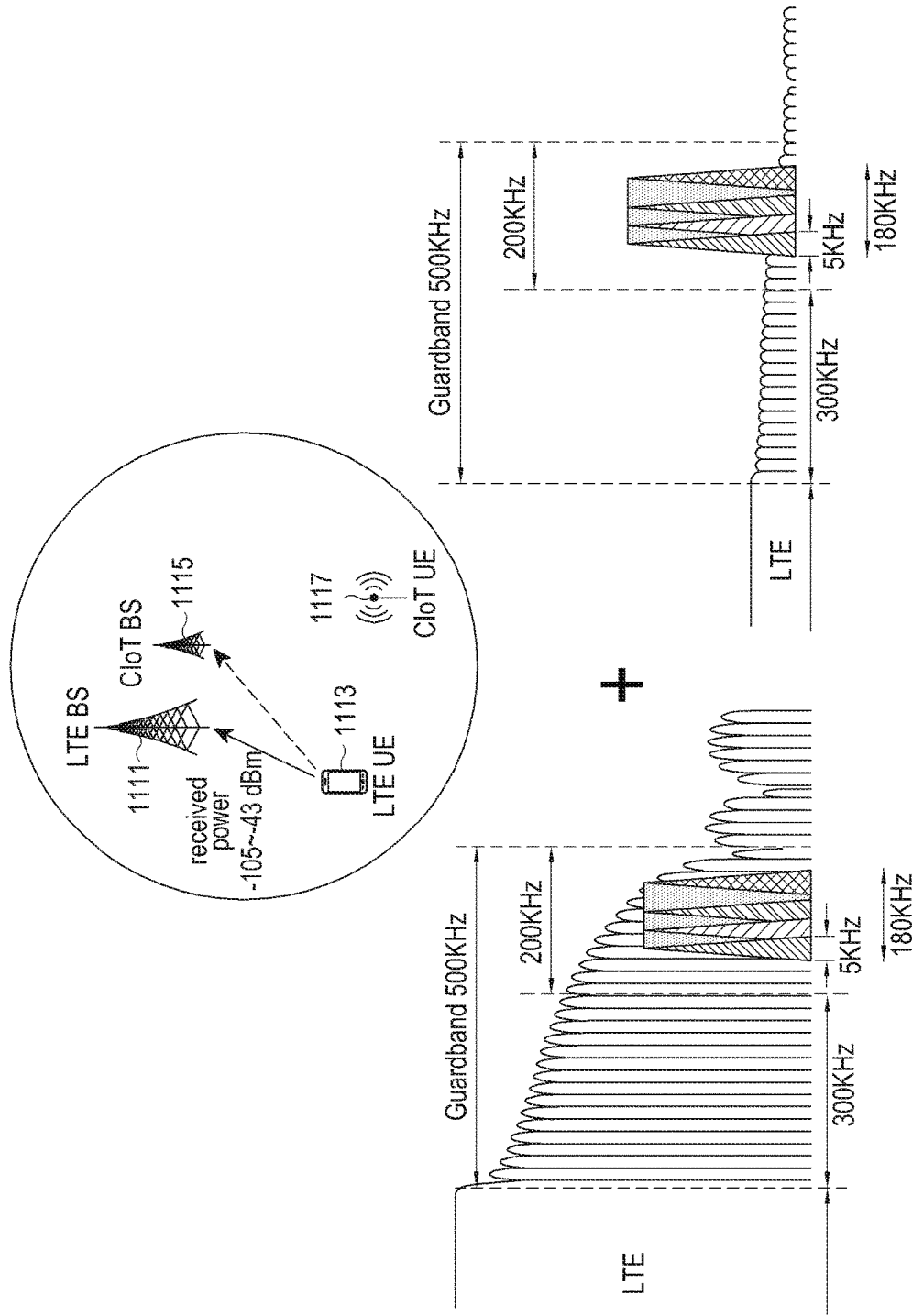
FIG. 11 illustrates a received signal level in a case in which a CIoT BS receives an LTE UL signal when an LTE TDD communication system coexists with a CIoT TDD according to an embodiment of the present disclosure.

FIG. 11 illustrates a received signal level in a case in which a CIoT BS 1115 receives an LTE UL signal when an LTE TDD communication system coexists with a CIoT TDD according to an embodiment of the present disclosure.

Referring to FIG. 11, an LTE UL signal transmitted by an LTE UE 1113 is received, by an LTE BS 1111, within a received power range from −105 dBm to −43 dBm. A CIoT BS 1115 may receive the LTE UL signal transmitted by the LTE UE 1113 within a received power range from −105 dBm to −43 dBm. In FIG. 11, a CIoT UE 1117 does not perform an transmitting/receiving operation.

As described in FIG. 11, the CIoT BS 1115 may detect whether a received LTE signal is an LTE DL signal or an LTE UL signal by detecting an energy of the received LTE signal. That is, transmission power applied to the LTE DL signal is significantly larger than transmission power applied to the LTE UL signal, so the CIoT BS 1115 may detect whether the received LTE signal is the LTE DL signal or the LTE UL signal by detecting an energy of the received LTE signal.

The CIoT BS 1115 may detect energy of a received LTE signal by detecting energy in a GB region without detecting energy in an inband region of an LTE TDD communication system, so the CIoT BS 1015 may detect whether the received LTE signal is an LTE DL signal or an LTE UL signal.

A received signal level in a case in which a CIoT BS receives an LTE UL signal when an LTE TDD communication system coexists with a CIoT TDD according to an embodiment of the present disclosure has been described with reference to FIG. 11, and an example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure will be described with reference to FIG. 12.

Figure 12:
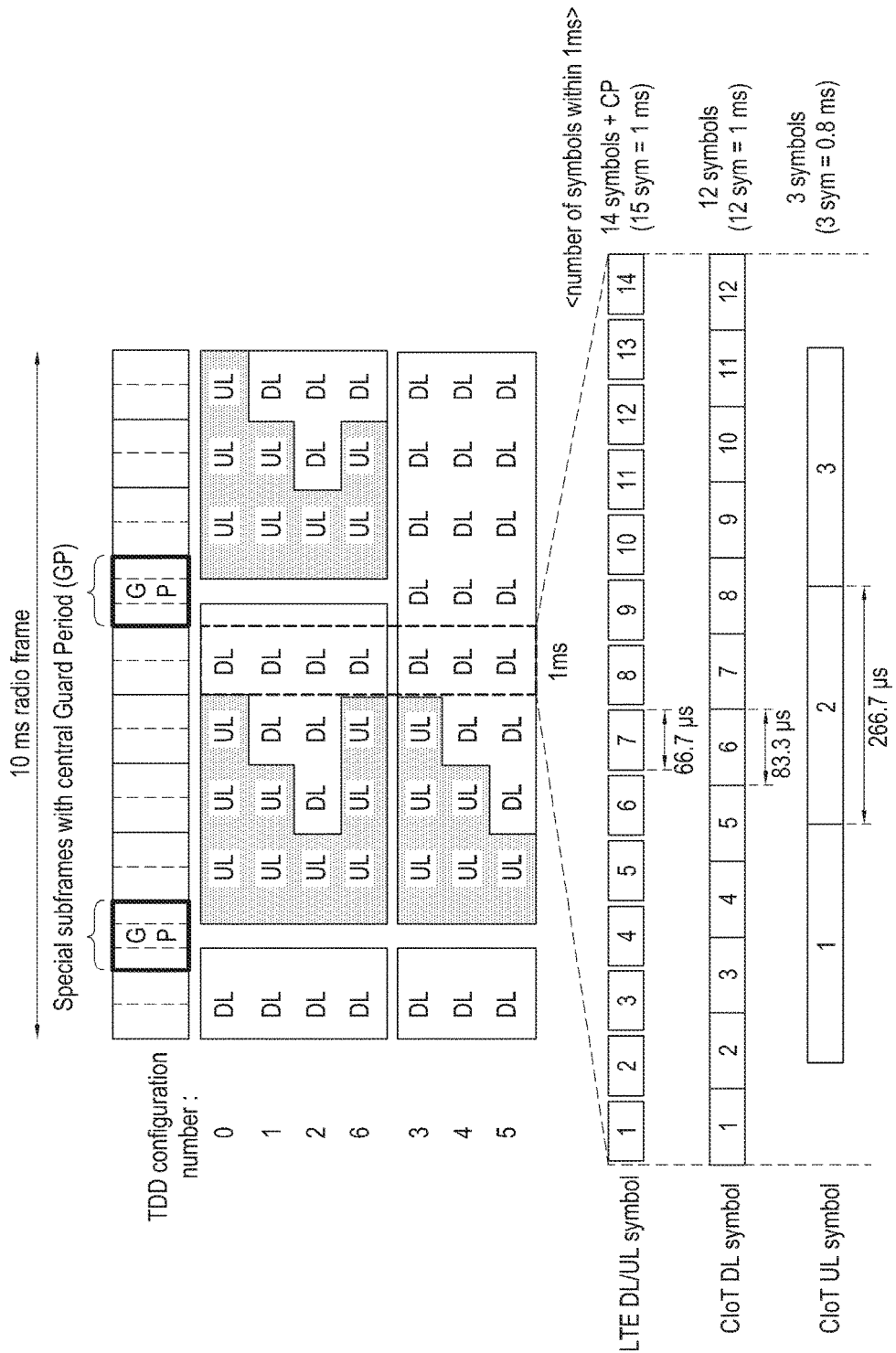
FIG. 12 illustrates an example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure.

FIG. 12 illustrates an example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure.

Referring to FIG. 12, the number of symbols which may be included in a specific subframe (e.g., a subframe #5 (i.e., the sixth subframe)) of a frame of an LTE TDD communication system will be described below.

(1) 14 LTE DL/UL symbols and one cyclic prefix (CP) symbol may be included in the subframe #5. That is, in an LTE TDD communication system, 15 symbols may be included in one subframe. A length of the 15 symbols is 1 ms.

(2) 12 CIoT DL symbols may be included in the subframe #5. That is, in a CIoT TDD, 12 symbols may be included in one subframe. A length of the 12 symbols is 1 ms.

(3) 3 CIoT UL symbols may be included in the subframe #5. That is, in a CIoT TDD, 3 symbols may be included in one subframe. A length of the 3 symbols is 0.8 ms.

As described in FIG. 12, in a case in which an LTE TDD communication system coexists with a CIoT TDD, that is, in a case in which relation among an LTE DL/UL symbol, a CIoT DL symbol, and a CIoT UL symbol is described as FIG. 12, a scheme of calculating an initial margin will be described below.

Firstly, parameters will be defined for calculating the initial margin.

(1) Cell radius: R[km]

(2) Maximum round trip delay (RTD): 2R/c

Here, it will be assumed that c is 300 km/ms.

(3) Timing estimation error: $\Delta t$

The timing estimation error $\Delta t$ may be differently set for each of a case in which an LTE BS may cooperate with a CIoT BS, or a CIoT BS includes an LTE transceiver and a case in which an LTE BS may not cooperate with a CIoT BS, or a CIoT BS does not include an LTE transceiver.

For example, in the case in which the LTE BS may cooperate with the CIoT BS, or the CIoT BS includes the LTE transceiver, the timing estimation error $\Delta t$ may be zero ($\Delta t = 0$). Further, in the case in which the LTE BS may not cooperate with the CIoT BS, or the CIoT BS does not include the LTE transceiver, the timing estimation error $\Delta t$ may be greater than zero ($\Delta t > 0$).

(4) Length of a UL symbol in a CIoT: $L_{UL}$ ms (5) Length of consecutive LTE UL subframes: $N_{UL}$ ms The initial margin may be expressed as Equation (1).

$$M_{init} = N_{UL} - \text{floor}[N_{UL}/L_{UL}] \cdot L_{UL} + L_{UL} \max[\text{ceil}[(2R/c + 2 \cdot \Delta_t - N_{UL})/L_{UL} + \text{floor}(N_{UL}/L_{UL})], 0] \quad \text{Equation (1).}$$

In Equation (1), $M_{init}$ denotes the initial margin.

The number of CIoT symbols which may be included during the length of consecutive LTE UL subframes $N_{UL}$ ms may be expressed as Equation (2). Here, $N_{sym}$ denotes the number of CIoT symbols.

$$N_{sym}=(N_{UL}-M_{init})/L_{UL} \qquad \text{Equation (2)}.$$

An example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure has been described with reference to FIG. 12, and another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure will be described with reference to FIG. 13.

Figure 13:
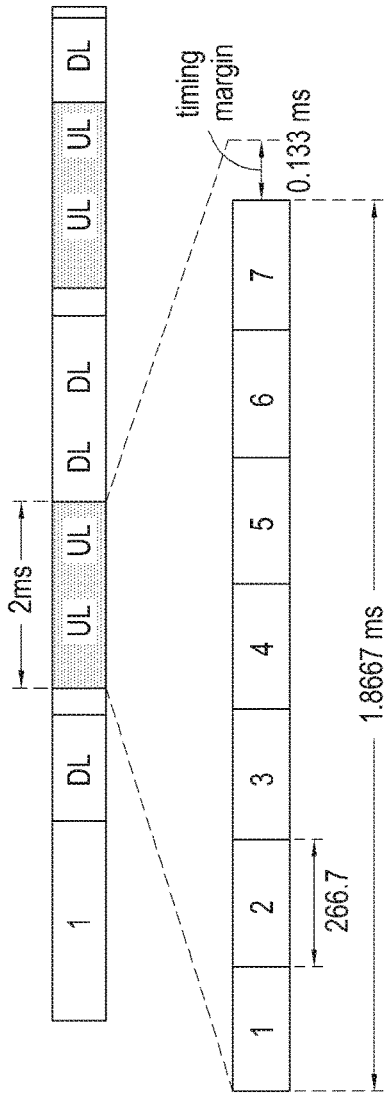
FIG. 13 illustrates another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure.

FIG. 13 illustrates another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure.

Referring to FIG. 13, it will be noted that relation among an LTE DL/UL symbol, a CIoT DL symbol, and a CIoT UL symbol is relation among an LTE DL/UL symbol, a CIoT DL symbol, and a CIoT UL symbol in a case in which an LTE BS may cooperate with a CIoT BS, or a CIoT BS includes an LTE transceiver, that is, in a case in which Δt=0, and a TDD configuration number 1 is used.

It will be assumed that R is 10 km, maximum RTD may be expressed as Equation (3), $L_{UL}$ ms is 0.2667 ms (=266.67 μs), and $N_{UL}$ ms is 2 ms.

$$2R/c = 2\times 10 \text{ km}\times \frac{100\text{ μs}}{30\text{ km}} = \frac{2000}{30}\text{μs} = 66.67\text{ μs} = 0.06667\text{ ms}. \qquad \text{Equation (3)}$$

Under the described assumption, an initial margin, i.e., an initial value of a timing margin may be expressed as Equation (4).

$$M_{init} = N_{UL} - \text{floor}\left[\frac{N_{UL}}{L_{UL}}\right]\cdot L_{UL} + L_{UL}\cdot$$

$$\max\left(\text{ceil}\left[\frac{\frac{2R}{c}+2\Delta_t - N_{UL}}{L_{UL}} + \text{floor}\left[\frac{N_{UL}}{L_{UL}}\right]\right], 0\right)$$

$$= 2\text{ ms} - \left\lfloor\frac{2\text{ ms}}{0.26667\text{ ms}}\right\rfloor\cdot 0.26667\text{ ms} + 0.26667\text{ ms}\cdot$$

$$\max\left(\left\lceil\frac{(0.06667\text{ ms}-2\text{ ms})}{0.26667\text{ ms}} + \left\lfloor\frac{2\text{ ms}}{0.26667\text{ ms}}\right\rfloor\right\rceil, 0\right)$$

$$= 2\text{ ms} - 7\cdot 0.26667\text{ ms} + 0.26667\text{ ms}\cdot$$

$$\max(\lceil -7.2490 + 7\rceil, 0)$$

$$= 2\text{ ms} - 1.8667\text{ ms} + 0.26667\text{ ms}\cdot\max(0,0)$$

$$= 2\text{ ms} - 1.8667\text{ ms}$$

$$= 0.133\text{ ms}.$$

Equation (4)

$N_{sym}$ may be expressed as Equation (5).

$$N_{sym}=(2\text{ ms}-0.133\text{ ms})/0.26667\text{ ms}=7 \qquad \text{Equation (5)}.$$

Another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure has been described with reference to FIG. 13, and still another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure will be described with reference to FIG. 14.

Figure 14:
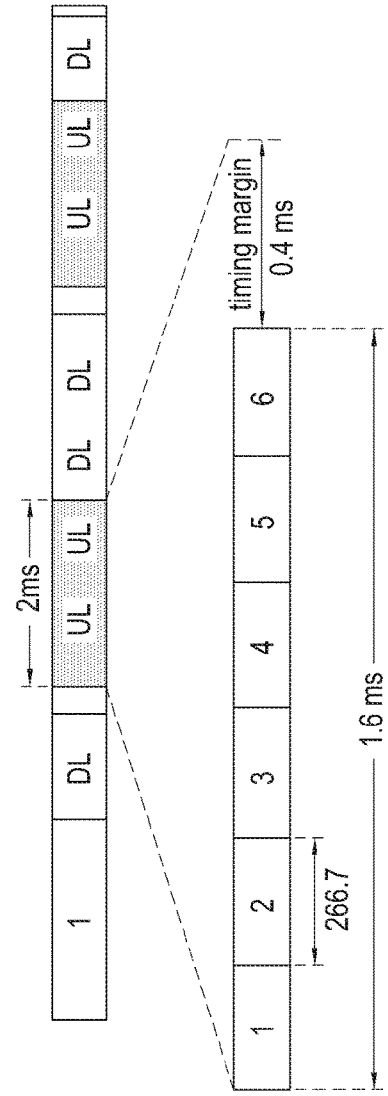
FIG. 14 illustrates still another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure.

FIG. 14 illustrates still another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure.

Referring to FIG. 14, it will be noted that relation among an LTE DL/UL symbol, a CIoT DL symbol, and a CIoT UL symbol is relation among an LTE DL/UL symbol, a CIoT DL symbol, and a CIoT UL symbol in a case in which an LTE BS may cooperate with a CIoT BS, or a CIoT BS includes an LTE transceiver, that is, in a case in which Δt=0, and a TDD configuration number 1 is used.

It will be assumed that R is 10 km, maximum RTD may be expressed as Equation (3), $L_{UL}$ ms is 0.2667 ms (=266.67 μs), and $N_{UL}$ ms is 2 ms.

$$2R/c = 2\times 30 \text{ km}\times \frac{100\text{ μs}}{30\text{ km}} = \frac{6000}{30}\text{μs} = 0.2\text{ ms}. \qquad \text{Equation (6)}$$

Under the described assumption, an initial margin, i.e., an initial value of a timing margin may be expressed as Equation (7).

$$M_{init} = N_{UL} - \text{floor}\left[\frac{N_{UL}}{L_{UL}}\right]\cdot L_{UL} + L_{UL}\cdot$$

$$\max\left(\text{ceil}\left[\frac{\frac{2R}{c}+2\Delta_t - N_{UL}}{L_{UL}} + \text{floor}\left[\frac{N_{UL}}{L_{UL}}\right]\right], 0\right)$$

$$= 2\text{ ms} - \left\lfloor\frac{2\text{ ms}}{0.26667\text{ ms}}\right\rfloor\cdot 0.26667\text{ ms} + 0.26667\text{ ms}\cdot$$

$$\max\left(\left\lceil\frac{(0.2\text{ ms}-2\text{ ms})}{0.26667\text{ ms}} + \left\lfloor\frac{2\text{ ms}}{0.26667\text{ ms}}\right\rfloor\right\rceil, 0\right)$$

$$= 2\text{ ms} - 7\cdot 0.26667\text{ ms} + 0.26667\text{ ms}\cdot$$

$$\max(\lceil -6.7499 + 7\rceil, 0)$$

$$= 2\text{ ms} - 1.8667\text{ ms} + 0.26667\text{ ms}$$

$$= 0.4\text{ ms}.$$

Equation (7)

$N_{sym}$ may be expressed as Equation (8).

$$N_{sym}=(2\text{ ms}-0.4\text{ ms})/0.26667\text{ ms}=6 \qquad \text{Equation (8)}.$$

Still another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure has been described with reference to FIG. 14, and still another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure will be described with reference to FIG. 15.

Figure 15:
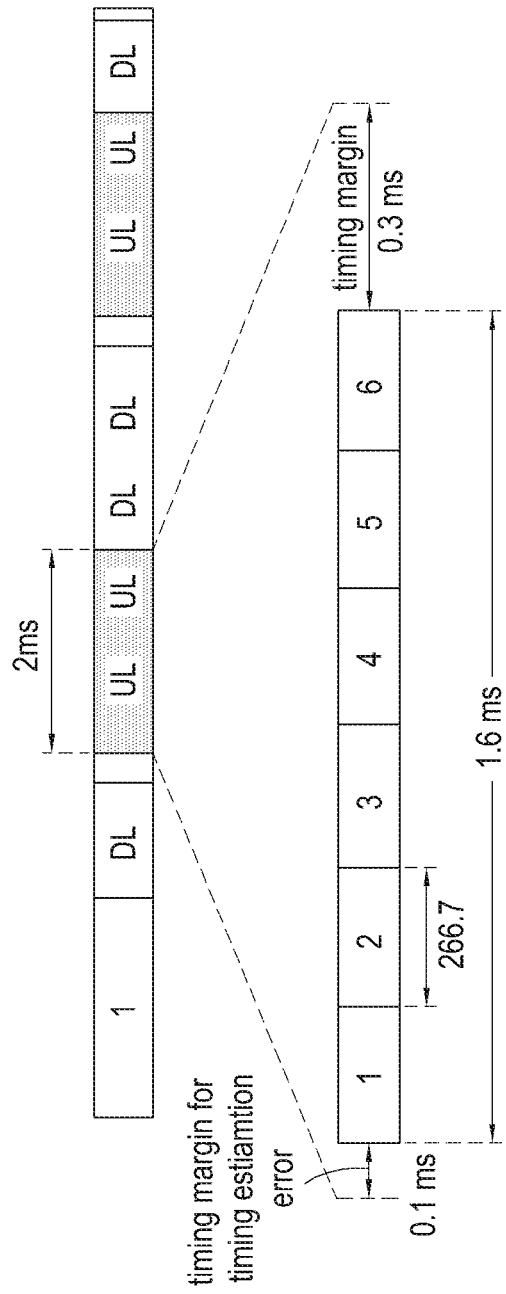
FIG. 15 illustrates still another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure.

FIG. 15 illustrates still another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure.

Referring to FIG. 15, it will be noted that relation among an LTE DL/UL symbol, a CIoT DL symbol, and a CIoT UL symbol is relation among an LTE DL/UL symbol, a CIoT DL symbol, and a CIoT UL symbol in a case in which an LTE BS may not cooperate with a CIoT BS, or a CIoT BS does not include an LTE transceiver, that is, in a case in which $\Delta_t>0$, and a TDD configuration number 1 is used.

It will be assumed that R is 10 km, maximum RTD may be expressed as Equation (9), $L_{UL}$ ms is 0.2667 ms (=266.67 μs), $N_{UL}$ ms is 2 ms, and an timing estimation error $\Delta_t$ is 0.1 ms ($\Delta_t$=0.1 ms).

$$2R/c = \qquad\qquad\qquad\qquad\qquad\qquad\text{Equation (9)}$$
$$2\times 10\text{ km}\times\frac{100\ \mu s}{30\text{ km}} = \frac{2000}{30}\mu s = 66.67\ \mu s = 0.06667\text{ ms}.$$

Under the described assumption, an initial margin, i.e., an initial value of a timing margin may be expressed as Equation (10). Here, the initial margin may include a DL initial margin and a UL initial margin, and the UL initial margin includes a first UL initial margin and a second UL initial margin. Here, the first UL initial margin denotes a UL initial margin applied to a start part of a CIoT UL interval, and the second UL initial margin denotes a UL initial margin applied to a last part of the CIoT UL interval. For example, it will be assumed that the first UL initial margin may be determined as $\Delta_t$.

$$M_{init} = N_{UL} - \text{floor}\left[\frac{N_{UL}}{L_{UL}}\right]\cdot L_{UL} + L_{UL}\cdot \qquad\text{Equation (10)}$$
$$\max\left(\text{ceil}\left[\frac{\frac{2R}{c}+2\Delta_t-N_{UL}}{L_{UL}}+\text{floor}\left[\frac{N_{UL}}{L_{UL}}\right]\right],0\right)$$
$$= 2\text{ ms} - \left\lfloor\frac{2\text{ ms}}{0.26667\text{ ms}}\right\rfloor\cdot 0.26667\text{ ms} + 0.26667\text{ ms}\cdot$$
$$\max\left(\left\lceil\frac{(0.06667\text{ ms}+0.2\text{ ms}-2\text{ ms})}{0.26667\text{ ms}}+\left\lfloor\frac{2\text{ ms}}{0.26667\text{ ms}}\right\rfloor\right\rceil,0\right)$$
$$= 2\text{ ms} - 7\cdot 0.26667\text{ ms} + 0.26667\text{ ms}\cdot$$
$$\max(\lceil -6.4999+7\rceil,0)$$
$$= 2\text{ ms} - 1.8667\text{ ms} + 0.26667\text{ ms}$$
$$= 0.4\text{ ms}.$$

In Equation (10), an initial margin $M_{init}$ is 0.4 ms. So, in FIG. 15, it will be understood that a margin applied to a start part of a UL is 0.1 ms and a margin applied to a last part of the UL is 0.3 ms.

$N_{sym}$ may be expressed as Equation (11).

$$N_{sym}=(2\text{ ms}-0.4\text{ ms})/0.26667\text{ ms}=6 \qquad\text{Equation (11)}$$

Still another example of relation among an LTE DL/UL symbol, a CIoT DL symbol, and a CIoT UL symbol under a frame structure of an LTE TDD communication system in a case in which the LTE TDD communication system coexists with a CIoT TDD according to an embodiment of the present disclosure has been described with reference to FIG. 15, and a margin updating process in a case in which an LTE TDD communication system coexists with a CIoT TDD according to an embodiment of the present disclosure will be described with reference to FIG. 16.

Figure 16:
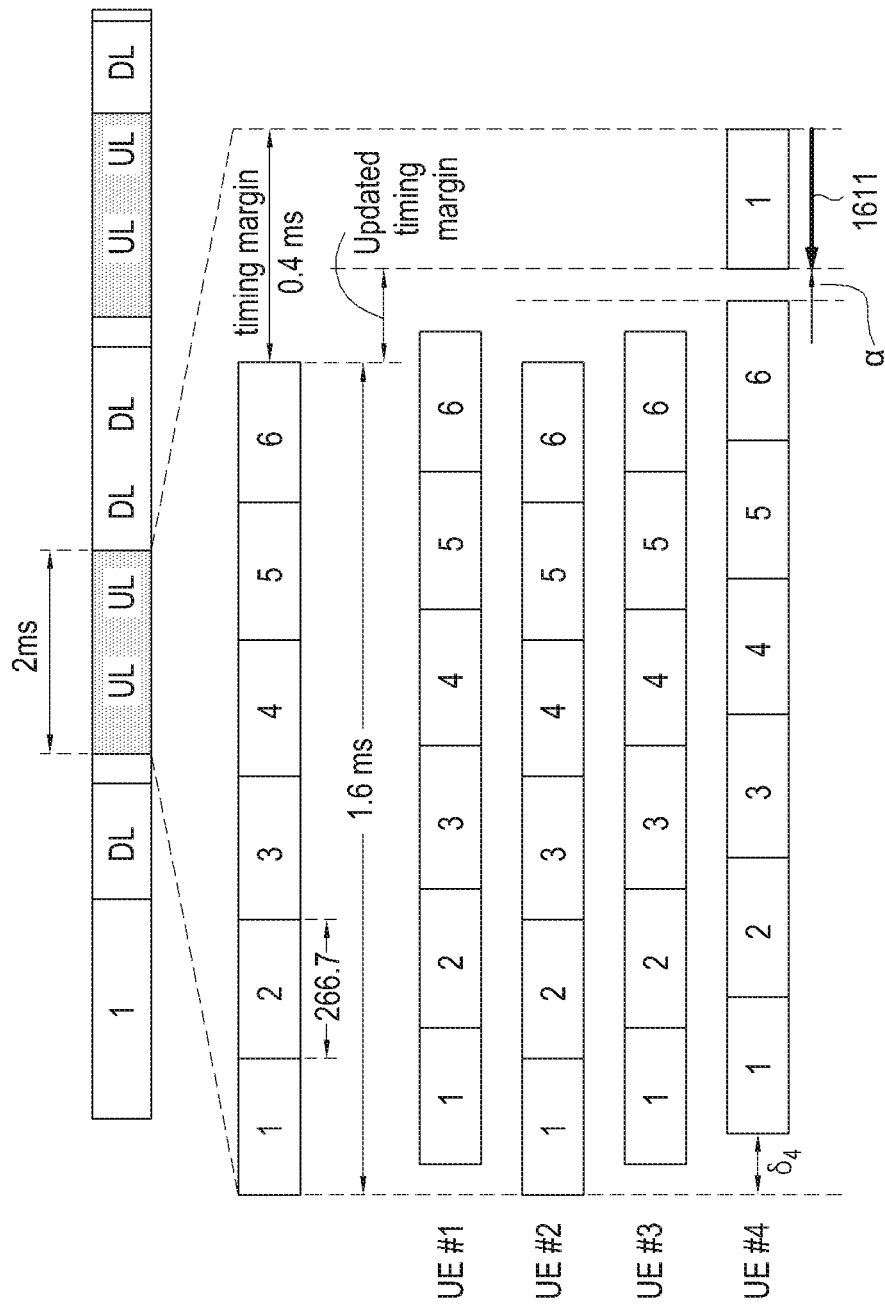
FIG. 16 illustrates a margin updating process in a case in which an LTE TDD communication system coexists with a CIoT TDD according to an embodiment of the present disclosure.

FIG. 16 illustrates a margin updating process in a case in which an LTE TDD communication system coexists with a CIoT TDD according to an embodiment of the present disclosure.

Referring to FIG. 16, it will be noted that a margin updating process in FIG. 16 is a margin updating process in a case in which relation among an LTE DL/UL symbol, a CIoT DL symbol, and a CIoT UL symbol in FIG. 15 is used. Here, the relation among the LTE DL/UL symbol, the CIoT DL symbol, and the CIoT UL symbol is relation among an LTE DL/UL symbol, a CIoT DL symbol, and a CIoT UL symbol in a case in which an LTE BS may not cooperate with a CIoT BS, or a MT BS does not include an LTE transceiver, that is, in a case in which $\Delta t>0$, and a TDD configuration number 1 is used.

A CIoT BS may update a timing margin based on CIoT UL signals received from CIoT UEs, e.g., a UE#1, a UE#2, a UE#3, and a UE#4, to which the CIoT BS provides a service, and the updated timing margin may be expressed as Equation (12).

$$M_{update} = N_{UL} - \text{floor}\left[\frac{N_{UL}}{L_{UL}}\right]\cdot L_{UL} + \qquad\text{Equation (12)}$$
$$L_{UL}\cdot\max\left(\text{ceil}\left[\frac{\max(\delta_1,\delta_2,\ldots)+\alpha+2\Delta_t-NUL}{L_{UL}}+\right.\right.$$
$$\left.\left.\text{floor}\left[\frac{N_{UL}}{L_{UL}}\right]\right],0\right)$$

In Equation (12), $\delta_i$ denotes arrived times of a UL signal transmitted by a UE#i, i.e., a CIoT UL signal transmitted by the UE#i, and may indicate delay time from preset reference time.

In Equation (12), a denotes an additional margin. If the additional margin a is set to a relatively high value, that is, if a timing margin is relatively largely decreased, a CIoT UL signal may affect a CIoT DL signal 1611 at the next symbol. The additional margin a needs to be determined based on relation between the CIoT UL signal and the CIoT DL signal. The additional margin a may be determined based on various parameters, and a detailed description thereof will be omitted herein.

A margin updating process in a case in which an LTE TDD communication system coexists with a CIoT TDD according to an embodiment of the present disclosure has been described with reference to FIG. 16, and an inner structure of an LTE BS in an LTE TDD communication system according to an embodiment of the present disclosure will be described with reference to FIG. 17.

Figure 17:
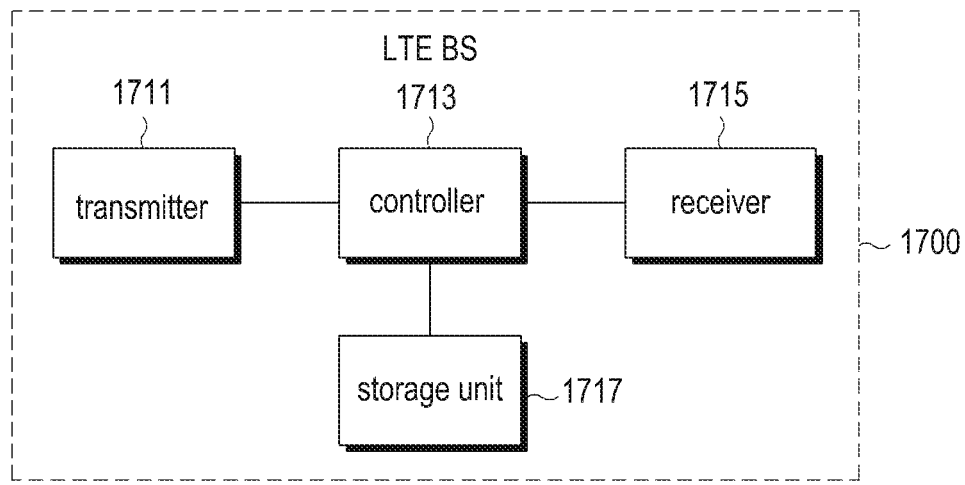
FIG. 17 illustrates an inner structure of an LTE BS in an LTE TDD communication system according to an embodiment of the present disclosure.

FIG. 17 illustrates an inner structure of an LTE BS in an LTE TDD communication system according to an embodiment of the present disclosure.

Referring to FIG. 17, an LTE BS 1700 includes a transmitter 1711, a controller 1713, a receiver 1715, and a storage unit 1717.

The controller 1713 controls the overall operation of the LTE BS 1700. More particularly, the controller 1713 controls an operation related to an operation of operating an RAT by considering interference, e.g., an operation of controlling UL/DL timing between an LTE TDD communication system and a CIoT TDD in a communication system supporting a TDD scheme according to an embodiment of the present disclosure. The operation related to the operation of operating the RAT by considering the interference, e.g., the operation of controlling the UL/DL timing between the LTE TDD communication system and the CIoT TDD in the communication system supporting the TDD scheme according to an embodiment of the present disclosure has been described with reference to FIGS. 2 to 16, and a detailed description thereof will be omitted herein.

The transmitter 1711 transmits various signals and various messages to other entities, e.g., a CIoT BS, an LTE UE, and/or the like under a control of the controller 1713. The various signals and various messages transmitted in the transmitter 1711 have been described with reference to FIGS. 2 to 16, and a detailed description thereof will be omitted herein.

The receiver 1715 receives various signals and various messages from the other entities under a control of the controller 1713. The various signals and various messages received in the receiver 1715 have been described with reference to FIGS. 2 to 16, and a detailed description thereof will be omitted herein.

The storage unit 1717 stores various programs, various data, and the like related to the operation related to the operation of operating the RAT by considering the interference, e.g., the operation of controlling the UL/DL timing between the LTE TDD communication system and the CIoT TDD according to an embodiment of the present disclosure under a control of the controller 1713.

The storage unit 1717 stores various signals and various messages which are received by the receiver 1715 from the other entities.

While the transmitter 1711, the controller 1713, the receiver 1715, and the storage unit 1717 are described in the LTE BS 1700 as separate units, it is to be understood that this is merely for convenience of description. In other words, two or more of the transmitter 1711, the controller 1713, the receiver 1715, and the storage unit 1717 may be incorporated into a single unit.

The LTE BS 1700 may be implemented with one processor.

An inner structure of an LTE BS in an LTE TDD communication system according to an embodiment of the present disclosure has been described with reference to FIG. 17, and an inner structure of a CIoT BS in a CIoT TDD according to an embodiment of the present disclosure will be described with reference to FIG. 18.

Figure 18:
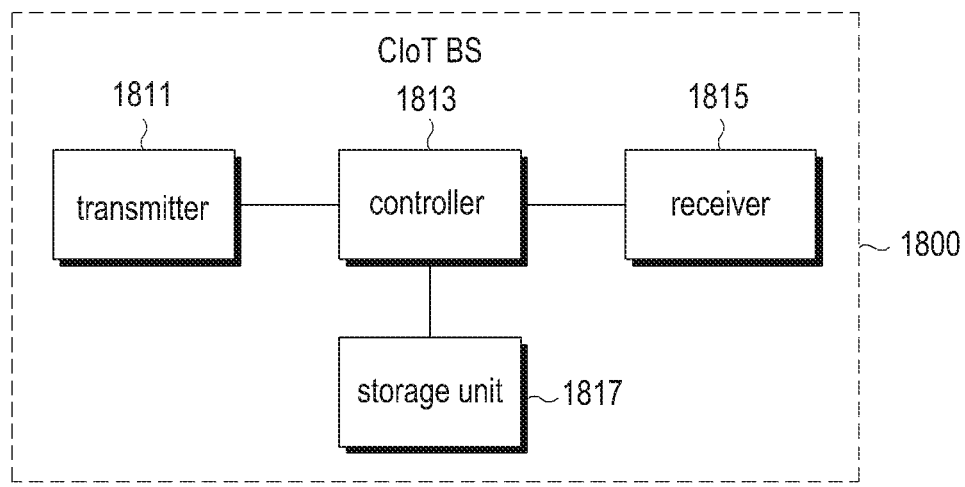
FIG. 18 illustrates an inner structure of a CIoT BS in a CIoT TDD according to an embodiment of the present disclosure.

FIG. 18 illustrates an inner structure of a CIoT BS in a CIoT TDD according to an embodiment of the present disclosure.

Referring to FIG. 18, a CIoT BS 1800 includes a transmitter 1811, a controller 1813, a receiver 1815, and a storage unit 1817.

The controller 1813 controls the overall operation of the CIoT BS 1800. More particularly, the controller 1813 controls an operation related to an operation of operating an RAT by considering interference, e.g., an operation of controlling UL/DL timing between an LTE TDD communication system and a CIoT TDD in a communication system supporting a TDD scheme according to an embodiment of the present disclosure. The operation related to the operation of operating the RAT by considering the interference, e.g., the operation of controlling the UL/DL timing between the LTE TDD communication system and the CIoT TDD in the communication system supporting the TDD scheme according to an embodiment of the present disclosure has been described with reference to FIGS. 2 to 16, and a detailed description thereof will be omitted herein.

The transmitter 1811 transmits various signals and various messages to other entities, e.g., an LTE BS, a CIoT UE, and/or the like under a control of the controller 1813. The various signals and various messages transmitted in the transmitter 1811 have been described with reference to FIGS. 2 to 16, and a detailed description thereof will be omitted herein.

The receiver 1815 receives various signals and various messages from the other entities under a control of the controller 1813. The various signals and various messages received in the receiver 1815 have been described with reference to FIGS. 2 to 16, and a detailed description thereof will be omitted herein.

The storage unit 1817 stores various programs, various data, and the like related to the operation related to the operation of operating the RAT by considering the interference, e.g., the operation of controlling the UL/DL timing between the LTE TDD communication system and the CIoT TDD according to an embodiment of the present disclosure under a control of the controller 1813.

The storage unit 1817 stores various signals and various messages which are received by the receiver 1815 from the other entities.

While the transmitter 1811, the controller 1813, the receiver 1815, and the storage unit 1817 are described in the CIoT BS 1800 as separate units, it is to be understood that this is merely for convenience of description. In other words, two or more of the transmitter 1811, the controller 1813, the receiver 1815, and the storage unit 1817 may be incorporated into a single unit.

The CIoT BS 1800 may be implemented with one processor.

An inner structure of a CIoT BS in a CIoT TDD according to an embodiment of the present disclosure has been described with reference to FIG. 18, and an inner structure of a CIoT UE in a CIoT TDD according to an embodiment of the present disclosure will be described with reference to FIG. 19.

Figure 19:
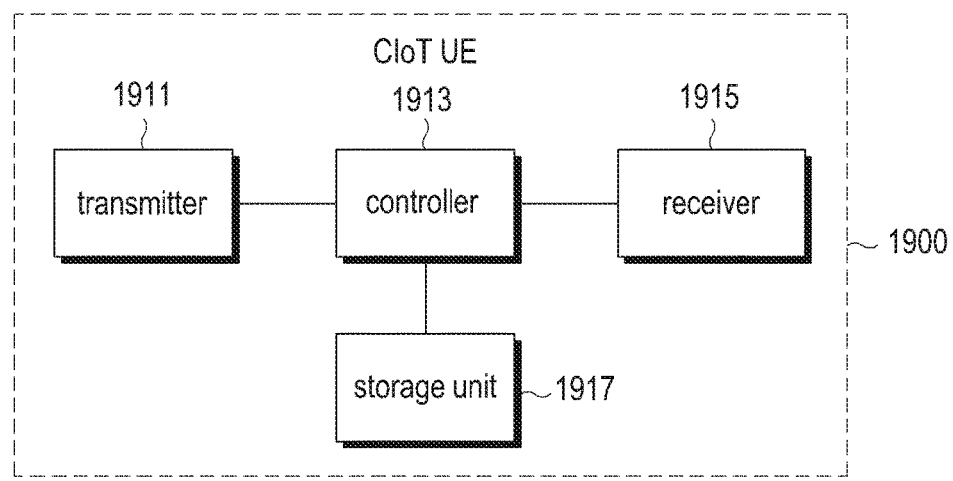
FIG. 19 illustrates an inner structure of a CIoT UE in a CIoT TDD according to an embodiment of the present disclosure.

FIG. 19 illustrates an inner structure of a CIoT UE in a CIoT TDD according to an embodiment of the present disclosure.

Referring to FIG. 19, a CIoT UE 1900 includes a transmitter 1911, a controller 1913, a receiver 1915, and a storage unit 1917.

The controller 1913 controls the overall operation of the CIoT UE 1900. More particularly, the controller 1913 controls an operation related to an operation of operating an RAT by considering interference, e.g., an operation of controlling UL/DL timing between an LTE TDD communication system and a CIoT TDD in a communication system supporting a TDD scheme according to an embodiment of the present disclosure. The operation related to the operation of operating the RAT by considering the interference, e.g., the operation of controlling the UL/DL timing between the LTE TDD communication system and the CIoT TDD in the communication system supporting the TDD scheme according to an embodiment of the present disclosure has been described with reference to FIGS. 2 to 16, and a detailed description thereof will be omitted herein.

The transmitter 1911 transmits various signals and various messages to other entities, e.g., a CIoT BS, and/or the like under a control of the controller 1913. The various signals and various messages transmitted in the transmitter 1911 have been described with reference to FIGS. 2 to 16, and a detailed description thereof will be omitted herein.

The receiver 1915 receives various signals and various messages from the other entities under a control of the controller 1913. The various signals and various messages received in the receiver 1915 have been described with reference to FIGS. 2 to 16, and a detailed description thereof will be omitted herein.

The storage unit 1917 stores various programs, various data, and the like related to the operation related to the operation of operating the RAT by considering the interference, e.g., the operation of controlling the UL/DL timing between the LTE TDD communication system and the CIoT TDD according to an embodiment of the present disclosure under a control of the controller 1913.

The storage unit 1917 stores various signals and various messages which are received by the receiver 1915 from the other entities.

While the transmitter 1911, the controller 1913, the receiver 1915, and the storage unit 1917 are described in the CIoT UE 1900 as separate units, it is to be understood that this is merely for convenience of description. In other words, two or more of the transmitter 1911, the controller 1913, the receiver 1915, and the storage unit 1917 may be incorporated into a single unit.

The CIoT UE 1900 may be implemented with one processor.

As is apparent from the foregoing description, an embodiment of the present disclosure enables to operate various RATs in a communication system supporting a TDD scheme.

An embodiment of the present disclosure enables to operate various RATs by considering interference in a communication system supporting a TDD scheme.

An embodiment of the present disclosure enables to synchronize DL and UL timing between RATs in a communication system supporting a TDD scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with embodiments, various changes and modifications may be suggested to one skilled in the art. It is intended that the present disclosure encompass such changes and modifications as fall within the scope of the appended claims.

What is claimed is:

1. An operating method of a base station (BS) supporting a time division multiplexing (TDD) scheme, the operating method comprising:
   receiving from a wideband cellular BS supporting a first radio access technology (RAT) or predicting, information of a TDD uplink (UL)-downlink (DL) subframe configuration used in the wideband cellular BS, and timing information indicating UL timing of the wideband cellular BS;
   determining margin information indicating timing margin for synchronizing the UL timing of the wideband cellular BS with UL timing of the BS supporting a second RAT different from the first RAT;
   transmitting, to a user equipment (UE) which uses the second RAT, the information of a TDD UL-DL subframe configuration used in the wideband cellular BS, the timing information of the wideband cellular BS and the margin information; and
   receiving, from the UE, uplink signals based on the information of the TDD UL-DL subframe configuration used in the wideband cellular BS, the timing information of the wideband cellular BS and the timing margin,
   wherein the timing margin is applied to a last part of each of the uplink signals by the UE.

2. The operating method of claim 1, further comprising: transmitting, to the UE, information related to a update period of the timing information.

3. The operating method of claim 1, further comprising: updating the margin information; and
   transmitting the updated margin information to the UE.

4. The operating method of claim 1, further comprising: if the information of the TDD UL-DL subframe configuration and the timing information of the wideband cellular BS is received from the wideband cellular BS, when the information of the TDD UL-DL subframe configuration and the timing information of the wideband cellular BS is updated, receiving, from the wideband cellular BS, the updated timing information of the wideband cellular BS.

5. The operating method of claim 1, further comprising:
if the information of the TDD UL-DL subframe configuration and the timing information of the wideband cellular BS is predicted by the BS, when the information of the TDD UL-DL subframe configuration and the timing information the wideband cellular BS is updated, predicting the information of the TDD UL-DL subframe configuration and the timing information of the wideband cellular BS which is updated by the wideband cellular BS.

6. The operating method of claim 1, wherein an initial value of the margin information is determined at least based on a cell radius supported by the second RAT.

7. The operating method of claim 1, wherein an initial value of the margin information is determined based on at least one of a size of a window which is used on energy detection and a sliding interval.

8. An operating method of a user equipment (UE) supporting a time division multiplexing (TDD) scheme, the operating method comprising:
receiving, from a base station (BS) which uses a second radio access technology (RAT), information of a TDD uplink (UL)-downlink (DL) subframe configuration used in a wideband cellular BS, timing information indicating UL timing of the wideband cellular BS supporting a first RAT different from the second RAT and margin information indicating timing margin for synchronizing the UL timing of the wideband cellular BS with UL timing of the BS supporting the second RAT; and
transmitting, to the BS, uplink signals based on the information of the TDD UL-DL subframe configuration used in the wideband cellular BS, the timing information of the wideband cellular BS and the timing margin,
wherein the timing margin is applied to a last part of each of the uplink signals by the UE.

9. The operating method of claim 8, wherein the timing information of the wideband cellular BS is received by the BS from the wideband cellular BS, or predicted by the BS.

10. The operating method of claim 8, further comprising:
receiving, from the BS, information related to a update period of the timing information.

11. The operating method of claim 8, further comprising:
receiving updated margin information from a second BS.

12. The operating method of claim 8, wherein an initial value of the margin information is determined at least based on a cell radius supported by the second RAT.

13. The operating method of claim 8, wherein an initial value of the margin information is determined based on at least one of a size of a window which is used on energy detection in the BS and a sliding interval which is used in the BS.

14. A base station (BS) supporting a time division multiplexing (TDD) scheme, the BS comprising:
a processor including a receiver and a controller configured to:
receive from a wideband cellular BS supporting a first radio access technology (RAT) or predict information of a TDD uplink (UL)-downlink (DL) subframe configuration used in the wideband cellular BS, and timing information indicating UL timing of the wideband cellular BS; and
determine margin information indicating timing margin for synchronizing the UL timing of the wideband cellular BS with UL timing of the BS supporting a second RAT different from the first RAT, and
a transmitter configured to transmit, to a user equipment (UE) which uses the RAT, the information of a TDD UL-DL subframe configuration used in the wideband cellular BS, the timing information of the wideband cellular BS and the margin information,
wherein the receiver is configured to receive, from the UE, uplink signals based on the information of the TDD UL-DL subframe configuration used in the wideband cellular BS, the timing information of the wideband cellular BS and the timing margin, and
wherein the timing margin is applied to a last part of each of the uplink signals by the UE.

15. The BS of claim 14, wherein the transmitter is configured to transmit, to the UE, information related to a update period of the timing information.

16. The BS of claim 14, further comprising:
the controller configured to update the margin information,
wherein the transmitter is configured to transmit the updated margin information to the UE.

17. The BS of claim 14, further comprising:
the receiver configured to receive, from the wideband cellular BS, updated timing information when the timing information is updated, if the timing information is received from the wideband cellular BS.

18. The BS of claim 14, further comprising:
the controller configured to predict the timing information which is updated by the wideband cellular BS when the timing information is updated, if the timing information is predicted by the BS.

19. The BS of claim 14, wherein an initial value of the margin information is determined at least based on a cell radius supported by the second RAT.

20. The BS of claim 14, wherein an initial value of the margin information is determined based on at least one of a size of a window which is used on energy detection and a sliding interval.

* * * * *